United States Patent
Cocchi et al.

(10) Patent No.: US 7,476,353 B2
(45) Date of Patent: Jan. 13, 2009

(54) METHOD FOR PRODUCING AN ICE CREAM MACHINE

(75) Inventors: Gino Cocchi, Bologna (IT); Roberto Lazzarini, Reggio Emilia (IT)

(73) Assignee: ALI S.p.A. Carpigiani Group, Anzola Emilia (IT)

( * ) Notice: Subject to any disclaimer, the term of this patent is extended or adjusted under 35 U.S.C. 154(b) by 0 days.

(21) Appl. No.: 10/452,251

(22) Filed: Jun. 3, 2003

(65) Prior Publication Data

US 2004/0004304 A1    Jan. 8, 2004

(30) Foreign Application Priority Data

Jul. 5, 2002    (IT) .................... GE2002A0061

(51) Int. Cl.
  *B29C 47/06*    (2006.01)
  *A23G 9/28*    (2006.01)
  *A23G 9/30*    (2006.01)

(52) U.S. Cl. .................................. 264/173.16

(58) Field of Classification Search .......... 264/173.16, 264/174.11, 259; 156/242, 243, 244.11, 156/244.12, 244.13, 245
See application file for complete search history.

(56) References Cited

U.S. PATENT DOCUMENTS

| | | | |
|---|---|---|---|
| 3,724,234 A * | 4/1973 | Garavelli | 62/308 |
| 3,767,169 A * | 10/1973 | Carpigiani | 366/349 |
| 3,943,091 A * | 3/1976 | Akiyama | 524/789 |
| 4,378,164 A | 3/1983 | Manfroni | |
| 4,463,704 A | 8/1984 | Farnam | |
| 4,488,817 A * | 12/1984 | Uesaka et al. | 366/149 |
| 4,629,648 A * | 12/1986 | Minick et al. | 428/189 |
| 4,711,376 A | 12/1987 | Manfroni | |
| 4,784,641 A * | 11/1988 | White | 604/77 |
| 4,836,420 A * | 6/1989 | Kromrey | 222/148 |
| 4,862,967 A * | 9/1989 | Harris | 166/387 |
| 5,199,278 A | 4/1993 | Cocchi | |
| 5,279,606 A * | 1/1994 | Haber et al. | 604/403 |
| 5,395,060 A * | 3/1995 | Hackel et al. | 241/92 |
| 5,528,863 A * | 6/1996 | Scott | 49/480.1 |
| 5,564,714 A | 10/1996 | Katsuno et al. | |
| 5,858,287 A * | 1/1999 | Scott | 264/45.9 |
| 5,898,105 A * | 4/1999 | Owens | 73/49.8 |
| 5,922,263 A * | 7/1999 | Endo et al. | 264/255 |
| 5,947,116 A * | 9/1999 | Gamow et al. | 128/201.11 |
| 5,957,163 A * | 9/1999 | Ito et al. | 138/109 |

(Continued)

FOREIGN PATENT DOCUMENTS

DE    2 059 737    *    6/1972

(Continued)

*Primary Examiner*—Melvin C Mayes
(74) *Attorney, Agent, or Firm*—Timothy J. Klima

(57) ABSTRACT

Method for the production of sealing elements on plastics articles. Said method includes the step of producing a film of silicone rubber on the sealing surface of the article. Advantageously, this film is formed by co-moulding or co-extrusion with the plastics article itself. The thickness of the said film may vary from a few tenths of a millimeter to a few millimeters. In the case of cylindrical elements, such as the pistons of the delivery cocks of ice cream machines, this film preferably covers only the side wall or the sealing part of the side wall of the cylindrical element, while in the case of flat elements, this film covers only the sealing surface of this element.

4 Claims, 3 Drawing Sheets

U.S. PATENT DOCUMENTS

| | | | | |
|---|---|---|---|---|
| 5,975,093 | A | * | 11/1999 | Joulia .......................... 132/293 |
| 5,977,266 | A | * | 11/1999 | Reil et al. .................... 525/402 |
| 6,403,027 | B1 | * | 6/2002 | Napoles et al. ................. 422/3 |
| 6,703,157 | B1 | * | 3/2004 | Shoji et al. .................... 429/56 |
| 2002/0062864 | A1 | * | 5/2002 | Griffin ........................ 137/240 |
| 2002/0121527 | A1 | * | 9/2002 | Good .......................... 222/94 |
| 2003/0088216 | A1 | * | 5/2003 | Py ............................. 604/203 |
| 2004/0081733 | A1 | * | 4/2004 | Buter et al. ................. 426/516 |

FOREIGN PATENT DOCUMENTS

| | | | |
|---|---|---|---|
| DE | 82 35 486 U1 | | 2/1986 |
| DE | 40 35 657 A1 | | 5/1992 |
| EP | 0 091 541 A2 | | 10/1983 |
| EP | 0 911 273 | * | 4/1999 |
| EP | 0 942 245 | * | 9/1999 |
| EP | 1 174 482 | * | 1/2002 |
| EP | 1 195 096 A1 | | 4/2002 |
| GB | 929476 | | 6/1963 |
| GB | 2 249 739 A | | 5/1992 |
| JP | 55-144124 | * | 11/1980 |
| JP | 58-2376 | * | 1/1983 |

* cited by examiner

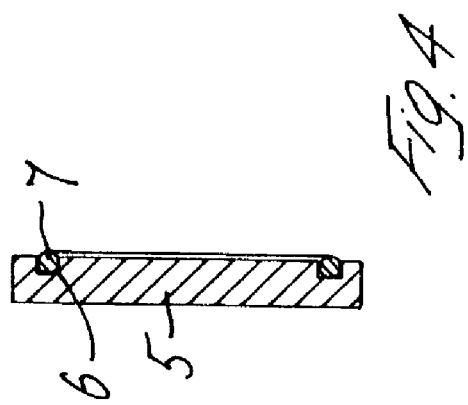
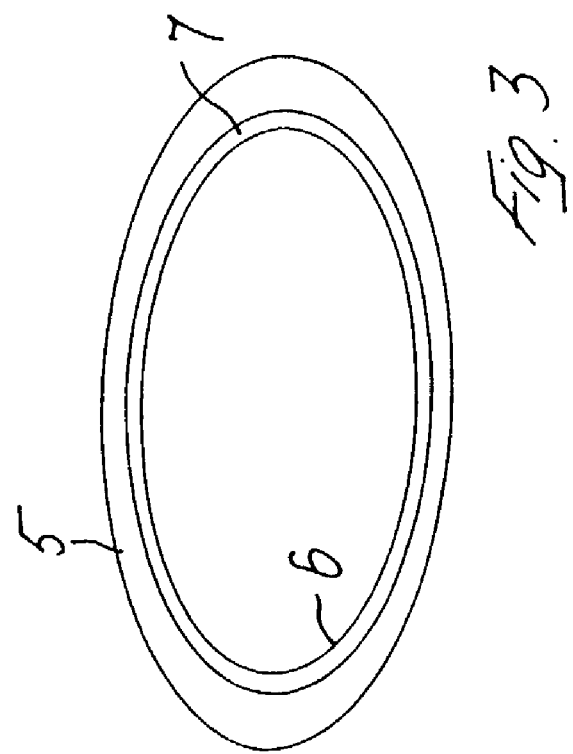

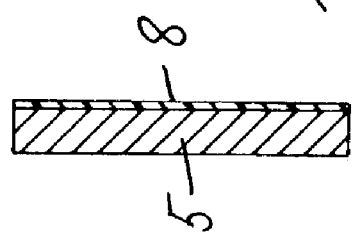
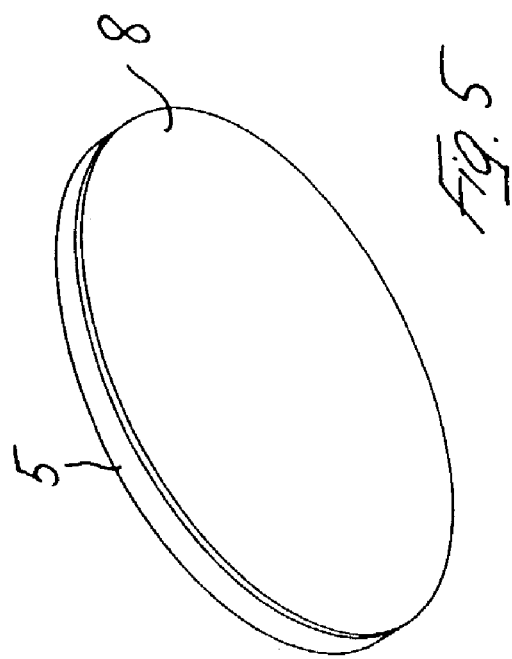

METHOD FOR PRODUCING AN ICE CREAM MACHINE

BACKGROUND AND SUMMARY OF THE INVENTION

The present invention relates to plastics articles, especially plastics articles forming elements of moving sealing devices, particularly for machines for producing and/or dispensing food products, such as the pistons of piston-type delivery cocks used in "soft"-type ice cream making machines, or the doors that close the ice cream delivery mouths of batchwise ice cream making machines, or more generally any moving closing element that requires a leaktight seal.

These elements have hitherto been fitted with O-rings seated in semicircular-section grooves formed in the actual article. However, in machines for producing and/or dispensing food products this sealing system has serious drawbacks in terms of hygiene because quantities of product get into the interstices between the grooves housing the O-rings and the O-rings themselves, from where the product is difficult to remove using the automatic washing cycles of these machines, and, given that such products are usually highly perishable, such as for example ice cream, its presence is a not insignificant source of bacterial contamination.

Furthermore, efficient cleaning of such elements would require removing the said O-rings from their seats, which would waste a lot of time and could damage the O-rings, possibly irreparably.

The object of the present invention is therefore to provide a method for the production of sealing elements on plastics articles, that will eliminate the disadvantages of the O-rings used at present and that will be easy and inexpensive to put into practice.

In accordance with the main characteristic of the present invention, this method consists in the production of a film of a silicone material on the sealing surface of the article. Advantageously, this film is co-moulded or co-extruded with the plastics article itself. The thickness of this film may vary from a few tenths of a millimetre to a few millimetres. In particular, in the case of cylindrical elements, such as the pistons of the delivery cocks of ice cream machines, this film preferably covers the whole cylindrical side wall of the piston, while in the case of flat elements this film covers only the sealing surface of this element. In both cases, the film covers the entire active surface of the element which seals, i.e., the surface of the element which abuts an adjacent surface in the food processing machine.

The advantages presented by the present method will be obvious. The silicone surfaces covering the articles have no roughnesses or nooks and crannies and can be washed completely clean with the greatest ease and simplicity. What is more, the cost of manufacture of these articles is much less than that of conventional articles fitted with O-rings.

BRIEF DESCRIPTION OF THE DRAWINGS

Other objects and advantages of the present invention will become clear in the course of the following detailed description of certain embodiments thereof, given by way of non-restrictive example with reference to the appended drawings, in which:

FIG. 3 is a rear view of a door used for example to close the ice cream discharge port of a machine for the batchwise production of ice cream;

FIG. 4 is a cross section through the door shown in FIG. 3;

FIG. 5 is a perspective view, from the rear, of a door of the same type as in FIG. 3, modified in accordance with the principles of the present invention; and FIG. 6 is a cross section through the door shown in FIG. 5.

DESCRIPTION OF THE PREFERRED EMBODIMENTS OF THE INVENTION

Figure 2:
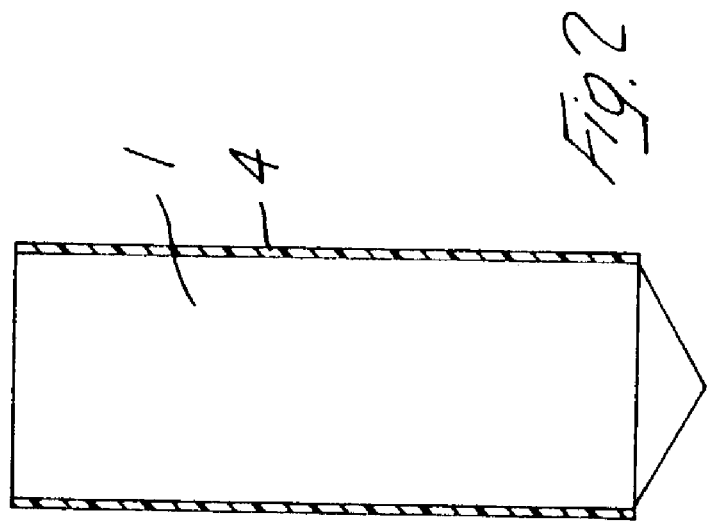
FIG. 2 is a side view, with parts in section, of a piston for an ice cream delivery cock of the same type as in FIG. 1, modified in accordance with the present invention.
Figure 1:
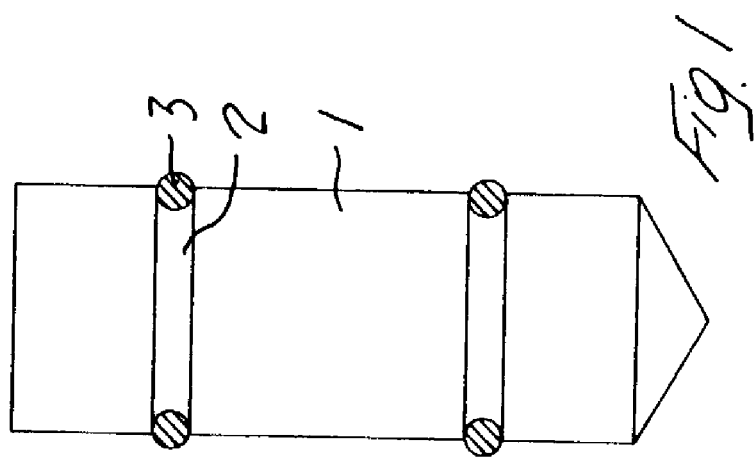
FIG. 1 is a side view, with parts in section, of a piston for an ice cream delivery cock as used for example in soft ice cream making machines or in water-ice dispensing machines.

With reference to the drawings, and with particular reference to FIG. 1 thereof, the number 1 indicates a conventional piston of the type used in ice cream or water-ice delivery cocks in machines for the extemporaneous production of these products. The said piston comprises a cylindrical, possibly conically-ended body made of a plastics material and provided with a series of annular grooves 2 for seating O-rings 3. As mentioned in the introductory part of this account, it is very difficult to carry out truly thorough cleaning that will eliminate all residues of ice cream from the interstices between the O-rings 3 and their seats 2, without removing the said O-rings 3 each time, in which process they may become damaged, and which in any case is very time-consuming.

In accordance with the present invention this problem is solved by forming on the side wall of the piston 1 a covering layer 4 of silicone rubber, the layer advantageously being produced by co-moulding or co-extruding the two plastics materials of the piston and of the coating. This characteristic not only makes the piston 1 leaktight but also easily and effectively solves the problem of how to clean it as there is nowhere for the highly perishable material such as ice cream to be trapped.

FIG. 3 illustrates the rear of a closing door 5 used for example to close the ice cream discharge port of a machine for the batchwise production of ice cream. As can be seen, this door 5, which is also made of a hard plastics material, has on its rear an annular groove 6 in which an O-ring 7 is seated. The problems presented by this door are the same as with the piston 1 of FIG. 1. FIGS. 5 and 6 show the modification of the door 5 according to the invention. In accordance with this modification, a layer of silicone rubber 8 has been applied to the rear of the door 5, again by co-moulding the materials of the door and of the silicone rubber.

The present invention is not of course limited to the illustrative embodiments shown and described but rather can be applied to any element having sealing means that present the problems discussed with reference to the elements illustrated and described.

We claim:

1. A method for producing an ice cream machine comprising covering an entire sealing surface of a moving sealing element acting on ice cream with a seal consisting of a film of silicone rubber, in order to facilitate cleaning of the moving sealing element, wherein said covering comprises forming the film of silicone rubber on the sealing surface by co-extrusion of the silicone rubber with the moving sealing element.

2. A method as in claim 1 wherein the sealing surface is a surface of a cylindrical element.

3. A method as in claim 1 wherein the sealing surface is flat.

4. A method for producing an ice cream machine comprising covering an entire sealing surface of a moving sealing element acting on ice cream with a seal consisting of a film of silicone rubber, the method not comprising providing one or more o-rings seals acting on the sealing surface of the moving sealing element, wherein said covering comprises forming the film of silicone rubber on the sealing surface by co-extrusion of the silicone rubber with the moving sealing element.

* * * * *